Inventor
Ernest Hagenlocher 2,745,267

Patented May 15, 1956

2,745,267

TORSIONALLY RESILIENT FLEXIBLE COUPLINGS

Ernest Hagenlocher, Warren, Pa.

Application February 11, 1952, Serial No. 271,008

2 Claims. (Cl. 64—13)

This invention relates to improvements in flexible couplings.

The primary object of this invention is the provision of an improved flexible coupling of the general type set forth in U. S. Patent 2,182,711, but having additional improved means to take care of torsional deflection; this application being a continuation in part of my co-pending application Serial No. 617,028, filed September 9, 1945, now U. S. Patent No. 2,593,877, and additionally embodying improved means for taking care of torsional deflection.

A further object of this invention is the provision of an improved flexible type coupling structure which includes laminated laterally flexible steel discs between the shaft coupling flanges for the purpose of taking care of misalignment and end float, and which additionally incorporates a torsionally resilient construction for the purpose of taking care of torsional stresses as an incident of relative turning movements between the shafts or coupling parts whereby to absorb and dampen disturbing oscillations, vibrations and shocks incident to rotary motion.

A further object of this invention is the provision of an improved means to positively limit the torsional stresses imposed upon the rubber element of coupling rubber sandwiches.

Other objects and advantages of this invention will be apparent during the course of the following detailed description.

In the accompanying drawing, forming a part of this specification, and wherein similar reference characters designate corresponding parts throughout the several views.

Figure 1:
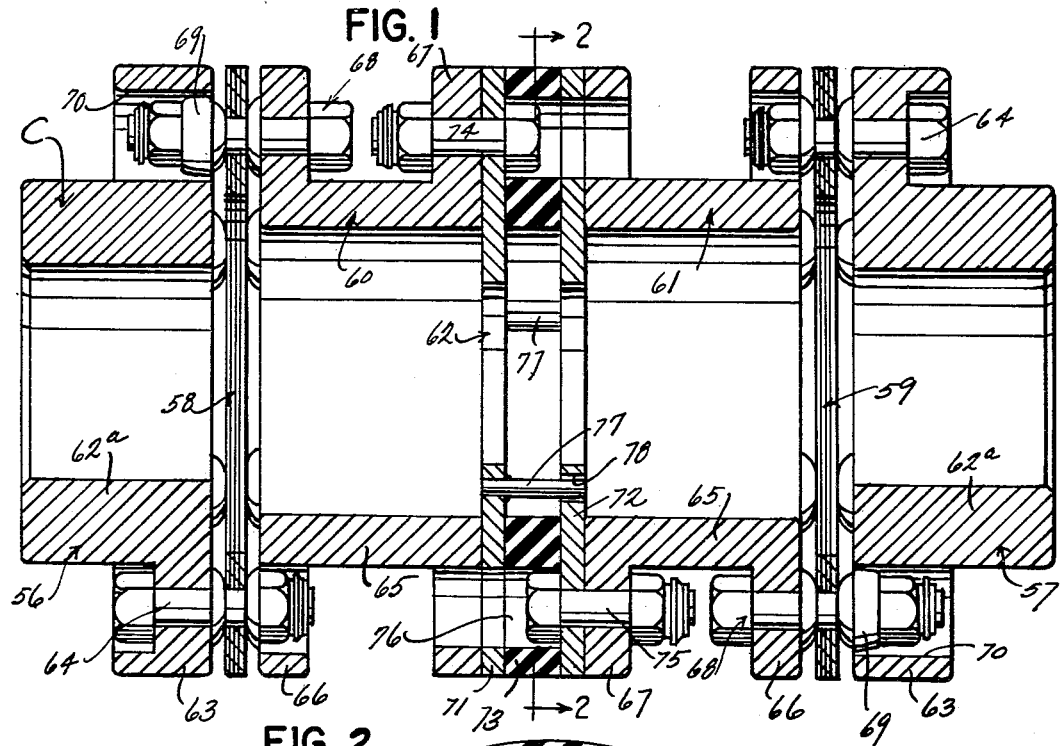
Figure 1 is a longitudinal cross sectional view taken thru the coupling; the same being of a so-called spool type and having an improved association of means to take care of misalignment, end float and torsional angular deflection.
Figure 2:
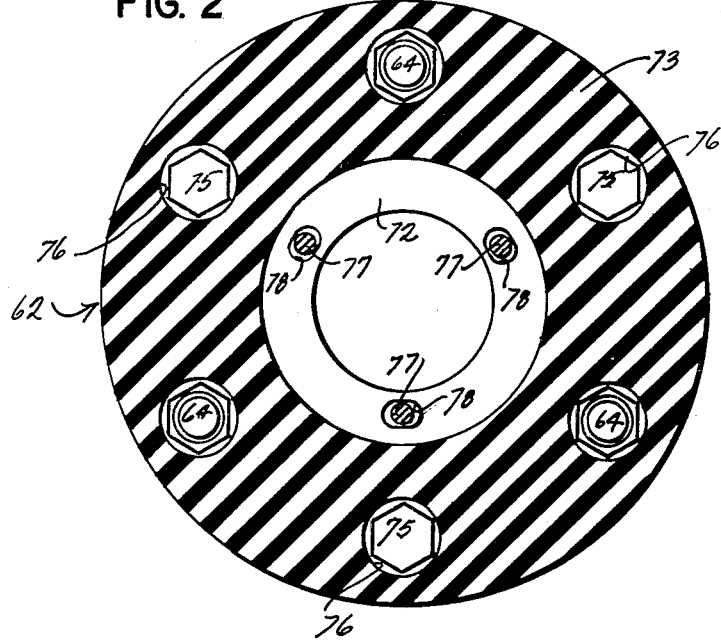
Figure 2 is a vertical cross sectional view taken thru the coupling of Figure 1 substantially on the line 2—2 of Figure 1.

In the drawing wherein for the purpose of illustration is shown a preferred embodiment of the improved coupling, the letter C designates the coupling. It is adaptable for taking care of angular misalignment, parallel misalignment, free end float and angular deflections of a torsional nature. It includes the shaft attaching coupling members or flanges 56 and 57, having respectively connected therewith laterally flexible laminated steel disc sets 58 and 59. Respectively, to these sets 58 and 59, are connected spool members 60 and 61, and between them is disposed the rubber sandwich structure 62.

The coupling members 56 and 57, to which drive and driven shafts or other machine parts are connected, each include hub portions 62ª and flanges 63. The latter are connected by bolt assemblages 64 to the disc sets 58 and 59, as shown in Figure 1. The spools 60 and 61 are of similar construction, each including a cylindrical body portion 65, a disc set attaching flange 66 and a rubber sandwich attaching flange 67. The flanges 66 of the spools 60 and 61 are connected by bolt assemblages 68 to the laminated steel disc sets 58 and 59, as shown in Figure 1 of the drawings, in circumferentially staggered relation with respect to the bolts 64. Each of the bolt sets 68 furthermore includes a safety feature bushing 69 which extends into the clearance hole or opening 70 in the flange 63 of each coupling member to prevent dropping of the parts upon fracture of the disc sets, etc. It should be noted at this point that these bushings 69 are tapered and rounded to have a slight clearance in the openings 70, in order to compensate for misalignment play of the coupling parts, etc.

The rubber sandwich 62 includes metal or rigid side plates 71 and 72 and the rubber core 73 having the characteristics above assigned to such cores. The core is vulcanized or otherwise bonded to the inside surfaces of the plates 71 and 72 and in parallelism therewith. The plate 71 is connected by bolt assemblages 74 to the flange 67 of spool 60 and similarly the plate or disc 72 is bolted to the flange 67 of the spool 61 by bolt assemblages 75. The latter are in circumferentially staggered relation with respect to the bolts 74. The heads of these bolts are socketed in openings 76 in the core 73, and aligned with these openings 76 there are openings thru the opposite sandwich plate and the spool flange, to permit access to the heads of the bolts.

As a limiting means upon torsional stresses imposed upon the core 73, I preferably provide pins 77 welded or otherwise fixed upon the plate 71 extending transversely across the space between the plates 71 and 72 and at their free ends having limited play within oblong openings 78 formed in the plate 72.

The spool type coupling C serves in connection with attachment of drive and driven shafts when operating a compressor, etc. The spools space the coupling flanges far enough apart so that ready access may be had thereto to remove flanges without moving the machines, and because of them the coupling has a greater capacity for misalignment. It is noted that their use shortens the bolt assemblage length, and this is desirable where the coupling is close to a compressor where long bolts could not be easily reached.

Various changes in the shape, size, and arrangement of parts may be made to the form of coupling herein shown and described, without departing from the spirit of the invention or scope of the claims.

I claim:

1. In a flexible coupling the combination of a pair of shaft attaching coupling parts each including a hub portion and an annular outwardly extending flange, two sets of laterally flexible steel laminations, bolts connecting one of each of said sets to one of each of said coupling parts upon the flanges of the latter and at annularly spaced bolt locations, a pair of metal spools each including a cylindrical body portion and an outwardly extending fixed flange at each end thereof, bolt means connecting the remote flanges of said spools, one to one set of laminations and the other to the other set of laminations at bolt zones circumferentially spaced with respect to the bolt zones where said laminations are bolted to the respective couplings parts, a rubber sandwich connected to the proximate flanges of said spools, said rubber sandwich comprising a pair of flat rigid metal plates having bonded therewith and therebetween a resilient rubber member of a construction to take care of torsional stresses on a torsion axis parallel with an axis at right angles to the plane of said plates and resilient member, means connecting said rubber sandwich to the proximate flanges of said spools comprising bolts which bolt the innermost flanges of the spools to the said flat plates of said rubber sandwich with the said flat plates in abutment with the said proximate flanges of the spools, the last mentioned bolts being removable to permit complete detachment of the rubber member and plates from between the said proximate flanges of the spools without disturbing the position of the spools with respect to their connection with the laminated disc sets.

2. A coupling as defined in claim 1 wherein means is provided entirely within the thickness boundary of the plates and resilient member of the rubber sandwich to limit the degree of relative angular turning movement of said plates for limiting torsional stresses in the resilient member.

References Cited in the file of this patent

UNITED STATES PATENTS

| | | |
|---|---|---|
| 2,182,711 | Thomas | Dec. 5, 1939 |
| 2,394,405 | Schjolin | Feb. 5, 1946 |
| 2,499,093 | Fast | Feb. 28, 1950 |
| 2,593,877 | Hagenlocher | Apr. 22, 1952 |

FOREIGN PATENTS

| | | |
|---|---|---|
| 532,393 | Great Britain | Jan. 23, 1941 |